United States Patent [19]
Fletcher et al.

[11] Patent Number: 6,138,156
[45] Date of Patent: Oct. 24, 2000

[54] SELECTING AND APPLYING CONTENT-REDUCING FILTERS BASED ON DYNAMIC ENVIRONMENTAL FACTORS

[75] Inventors: James Corvin Fletcher, Apex; David Louis Kaminsky, Chapel Hill; Carl Shawn Kessler, Raleigh, all of N.C.

[73] Assignee: International Business Machines Corporation, Armonk, N.Y.

[21] Appl. No.: 09/166,032

[22] Filed: Oct. 5, 1998

[51] Int. Cl.[7] .................................................. G06F 13/00
[52] U.S. Cl. ........................ 709/224; 709/217; 709/223
[58] Field of Search .................................. 709/206, 207, 709/217, 223, 224, 232, 246, 250, 313, 317, 328; 707/10, 104

[56] References Cited

U.S. PATENT DOCUMENTS

| | | | |
|---|---|---|---|
| 5,644,571 | 7/1997 | Seaman | 370/401 |
| 5,826,022 | 10/1998 | Nielsen | 709/206 |
| 5,928,325 | 7/1999 | Shaughnessy et al. | 709/206 |
| 5,944,782 | 8/1999 | Noble et al. | 709/202 |
| 5,991,806 | 11/1999 | McHann, Jr. | 709/224 |

*Primary Examiner*—Viet D. Vu
*Attorney, Agent, or Firm*—Marcia L. Doubet; Jeanine S. Ray-Yarletts

[57] ABSTRACT

A method, system, and computer-readable code with which environmental factors can be used to dynamically filter the content being delivered from a server to a user's workstation. A rule-based approach is used to select an appropriate filter, enabling varying types and degrees of content reduction to be applied based on currently-existing conditions. This provides a way to manage the volume of data received by the user, without requiring input from the user, by reducing the amount of data sent to him by a server. In the preferred embodiment, conditions to be monitored include billing information related to the user's account with his connection service provider; characteristics of the device he is currently using, including its available storage capacity; and/or behavioral characteristics of this user when he requests to download files.

10 Claims, 10 Drawing Sheets

From: Jane Q. Public
Subject: Very important!!

Message: It is very important that I talk to you about

Fig. 5A

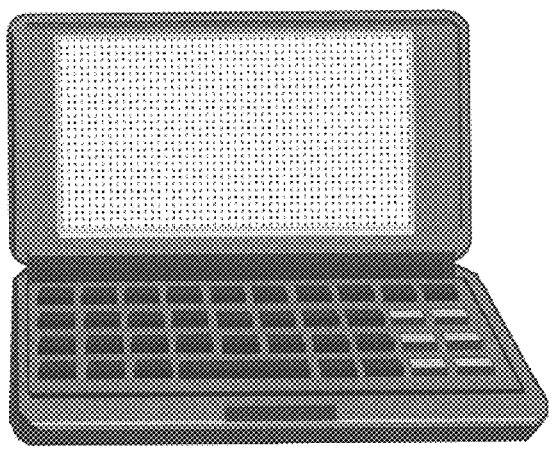
Fig. 5B1
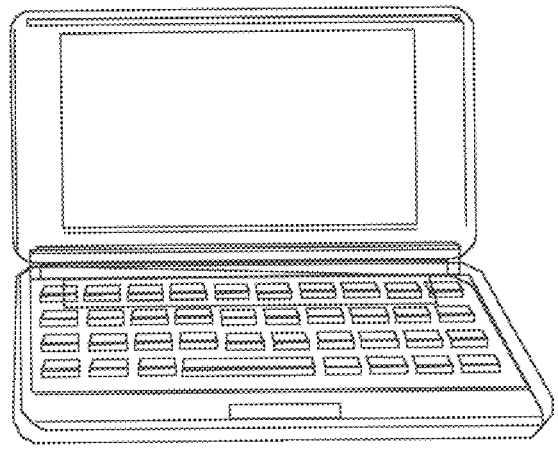
Fig. 5B2

SELECTING AND APPLYING CONTENT-REDUCING FILTERS BASED ON DYNAMIC ENVIRONMENTAL FACTORS

BACKGROUND OF THE INVENTION

1. Field of the Invention

The present invention relates to a computer system, and deals more particularly with a method, system, and computer-readable code for filtering message content based on dynamic environmental factors.

2. Description of the Related Art

It is commonplace today for computer users to connect their machines to other computers, known as "servers", through a network. The network may be a private network, such as a corporate intranet of networked computers that is accessible only to computer users within that corporation. Or, it may a public network, such as the Internet or World Wide Web. The Internet is a vast collection of computing resources, interconnected as a network, from sites around the world. The World Wide Web (referred to herein as the "Web") is that portion of the Internet which uses the HyperText Transfer Protocol ("HTTP") as a protocol for exchanging messages. (Alternatively, other protocols such as the "HTTPS" protocol can be used, where this protocol is a security-enhanced version of HTTP.)

The user may connect his computer to a server using a "wired" connection, or a "wireless" connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a Local Area Network (LAN) card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to as a "workstation", and use of the terms "workstation" or "server" refers to any of the types of computing devices described above.

A user of the Internet typically accesses and uses the Internet by establishing a network connection through the services of an Internet Service Provider (ISP). An ISP provides computer users the ability to dial a telephone number using their workstation modem (or other connection facility, such as satellite transmission), thereby establishing a connection to a remote computer owned or managed by the ISP. This remote computer then makes services available to the user's computer, hence such computers are often referred to as "servers". Typical services include: providing a search facility to search throughout the interconnected computers of the Internet for items of interest to the user; a browse capability, for displaying information located with the search facility; and an electronic mail facility, with which the user can send and receive mail messages to and from other computer users. Similar facilities are typically available when the user connects to a server in an intranet, or an extranet (that is, a network owned or managed by another company, and which provides services in a similar manner to the Internet or an intranet).

The user working in a networked environment will have software running on his workstation to allow him to create and send requests for information to a server, and to see the results. When the user connects to the Web, these functions are typically combined in software that is referred to as a "Web browser", or "browser". After the user has created his request using the browser, the request message is sent out into the Internet for processing. The target of the request message is one of the interconnected servers in the Internet network. That server will receive the message, attempt to find the data satisfying the user's request, format that data for display with the user's browser, and return the formatted response to the browser software running on the user's workstation. The response is often in the form of a full-screen display, referred to as a "Web page", that may contain text, graphics, images, sound, video, etc. The user will also typically have an electronic mail ("e-mail") software package installed on his workstation, which enables him to send and receive e-mail to and from the workstation of other computer users. Additionally, the user may have software on his workstation that supports sending requests to, and receiving responses from, automated file delivery services. For example, the File Transfer Protocol ("FTP") may be used to request that a file stored in a remote location be delivered to the user's workstation.

These are examples of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server".

As more people connect their workstations to networks, the number of messages and files being sent is skyrocketing. (Hereinafter, the terms "message" and "file" are used interchangeably when referring to data being sent through a network, unless otherwise stated.) Coupled with this increase in the number of network users and files is an increase in the size of the files commonly being sent. For example, a short e-mail message with a relatively simple graphic image attached may be on the order of several hundred thousand bytes of data. Users may send and receive many such files over the course of a day's work, or in their personal network communications. At the same time, the popularity of limited-storage workstations (such as handheld computers), as well as the popularity of connecting over media that uses graduated pricing (e.g. based on connect time), is also growing. Cellular services are a common example of graduated pricing based on connect time. Typically, a cellular user subscribes to a billing plan where he may have a certain fixed number of "free minutes" (or other units) per month, incurring additional charges for connection time after he exceeds this fixed number.

Computer users need a way to manage the volume of data received at their workstations, in a manner that accounts for these environmental factors. Reducing the volume of data received conserves workstation storage space, and reduces connect time. Users often have no way of knowing how large the files sent to them will be, and thus cannot control the volume of data they receive simply by tailoring the requests they make. Typically, it is the server that determines the size of the file that the user will receive, and the user's only option (if he has one at all) is to receive the entire file or to receive nothing.

One way of reducing the volume of data received is to apply a content-reducing "transcoding filter" to a file before it is sent by the server. Transcoding filters are software applications that algorithmically reduce the number of bits used to represent information while still retaining its essential content. Such filters are known in the art. For example, a transcoding filter can be applied to an image that was rendered using 256 colors (also known as "8-bit color"), to create a simpler version of the same image which uses only 16 colors. Or, the image could be converted to grayscale using a different transcoding filter. This type of filtering process greatly reduces the number of bytes in the resulting file.

However, a transcoding algorithm is typically selected statically. For example, a systems administrator may configure a server to apply 256-color to 16-color reduction for all image files being sent over wireless connections. Recently, transcoding systems (that is, a system which applies a transcoding filter) have been extended to select a filter based on current network traffic conditions. For example, if the transcoding system detects that the network over which it will send data is lightly loaded, it might send an image file without applying any content reduction filters; if it finds that the network is very heavily loaded, it might apply a transcoding filter to reduce the number of bits as much as possible.

There are no known systems that take into account dynamic environmental factors related directly to the user and his workstation when selecting a content filter. If an image file is requested, for example, the same huge image representation will be sent to the user regardless of whether his workstation has sufficient storage available for receiving the file and regardless of the cost of the connection over which he will receive the file.

Accordingly, a need exists for a technique by which environmental factors can be used to dynamically filter the content being delivered from a server to a user's workstation. The proposed technique uses a rule-based approach to select an appropriate filter, enabling varying types and degrees of content reduction to be applied based on currently-existing conditions. This provides a way to manage the volume of data received by the user, without requiring input from the user, by reducing the amount of data sent to him by a server.

SUMMARY OF THE INVENTION

An object of the present invention is to provide a technique with which environmental factors can be used to dynamically filter the content being delivered from a server to a user's workstation.

Another object of the present invention is to provide this filtering based on dynamic billing information.

It is another object of the present invention to provide this filtering based on dynamic workstation characteristic information.

It is a further object of the present invention to provide this filtering based on a particular user's behavior patterns.

It is yet another object of the present invention to provide this filtering using a combination of dynamic environmental factors.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment capable of having a connection to a network, for selecting and applying a content-reducing filter using dynamic environmental factors, comprising: one or more input files; at least one environmental monitor; a plurality of content-reducing transformations; a plurality of rules specifying selection criteria for selecting one of the transformations; a subprocess for receiving dynamic condition input from the monitor; a subprocess for selecting one of the rules using the dynamic condition input; and a subprocess for transforming the input file(s) using the transformation specified by the selected rule. The environmental monitor preferably monitors billing information, characteristics of a user's workstation, or a user's behavior when downloading files from a server. Or, more than one of such monitors may be used, in which case the subprocess for selecting one of the rules further comprises one of: a subprocess for selecting a most restrictive level of reduction using one of the selected rules for each of the monitors; or a subprocess for selecting one of the rules using a combination of the dynamic input from each of the monitors.

The present invention will now be described with reference to the following drawings, in which like reference numbers denote the same element throughout.

BRIEF DESCRIPTION OF THE DRAWINGS

FIGS. 5A, 5B1, 5B2 and 6A, 6B show examples of how a content filter affects data received by a user.

DESCRIPTION OF THE PREFERRED EMBODIMENT

Figure 1:
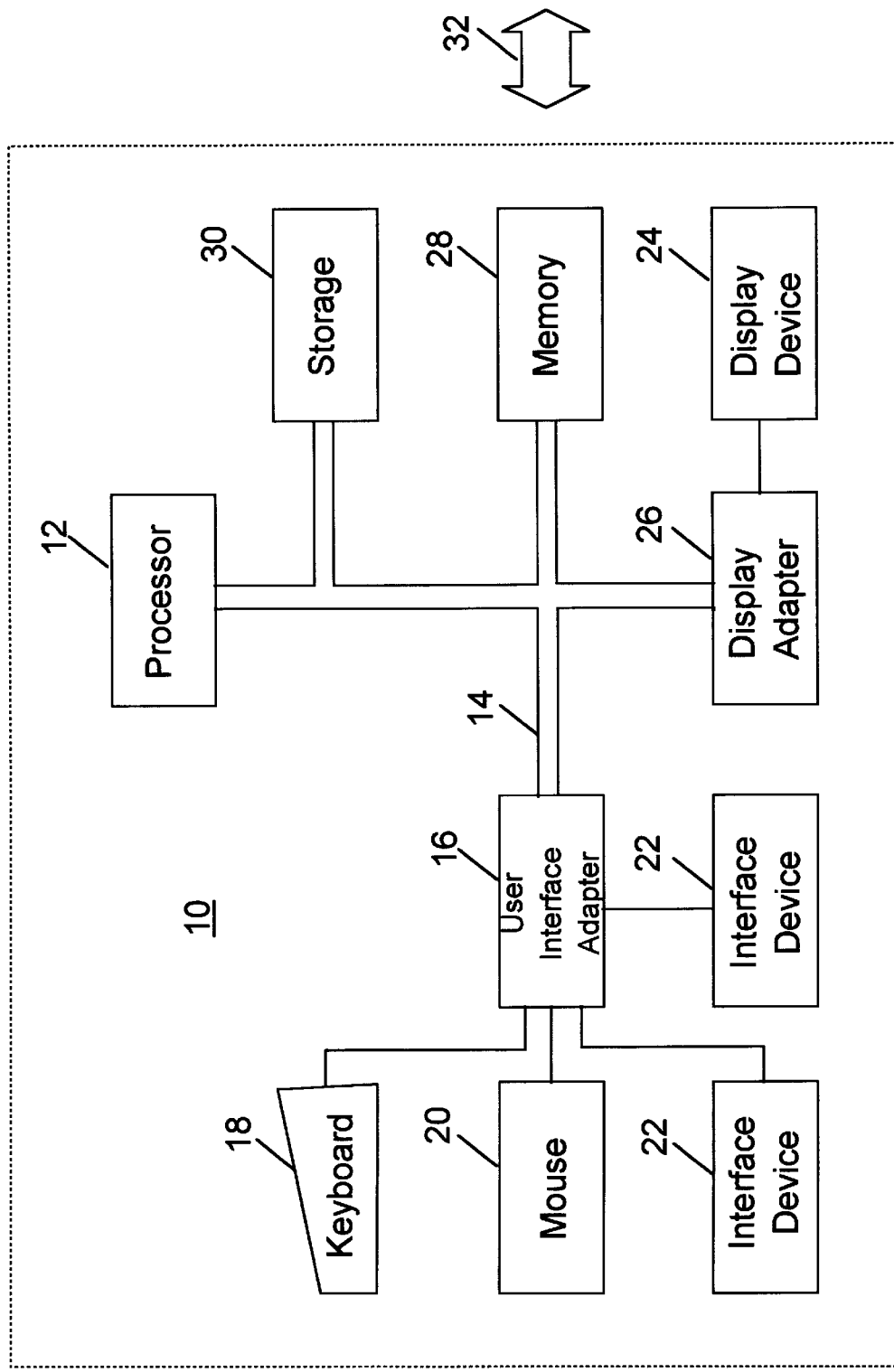
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

Figure 2:
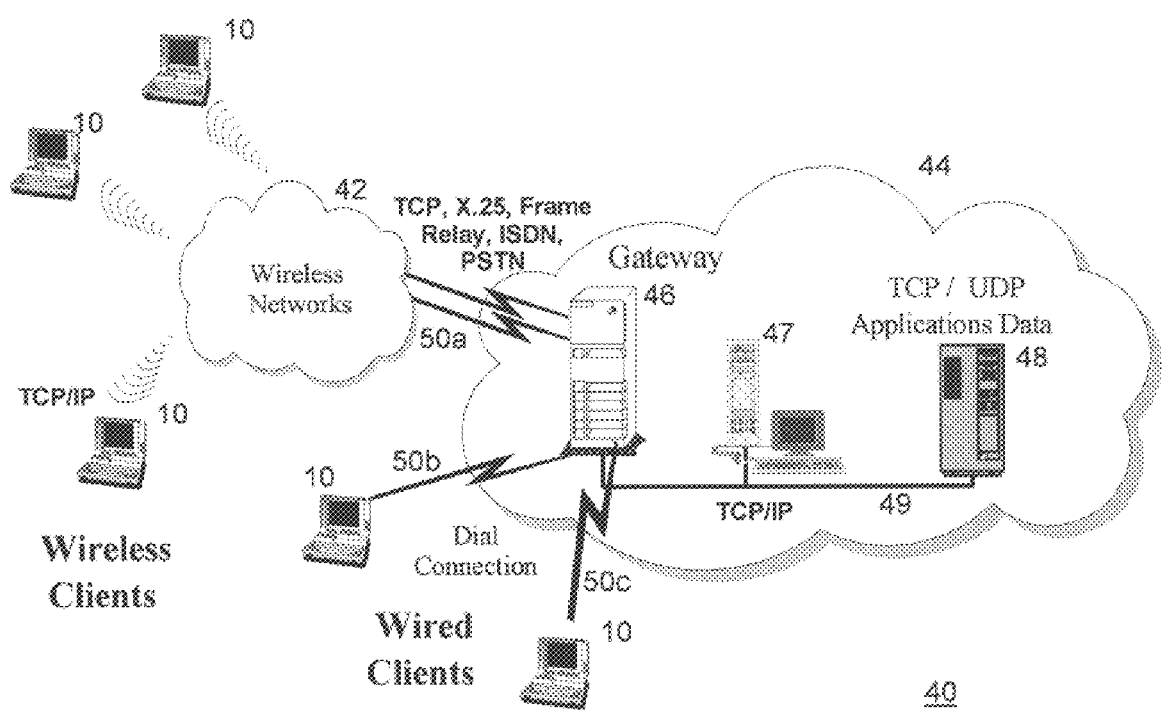
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wired) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations may be located in New York. The workstations 10 may connect to the wireless network 42 using the Transmission Control Protocol/ Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiment of the present invention will now be discussed with reference to FIGS. 3 through 6.

In the preferred embodiment, the present invention is implemented as a computer software program. This program will be used where software application(s) running on a server respond to a user's request, and return data to the user in response. Dynamic environmental factors will be monitored, and used as input to a filter selection process. The selected filter will be applied to transform the data located in response to the user's request, and the result of the transform will be sent to the client workstation. (The words "filter" and "transform" are used interchangeably herein.) The implementation of the logic for selecting the filter and performing the transformation process may be integrated with the code of the server application, as one or more modules (also referred to as code subroutines, or "objects" in object-oriented programming) which are invoked during execution of the server application. Alternatively, the logic may be implemented as a separate utility program, which provides services that are accessed by the server application. The implementation may execute on a computer functioning as a Web server, where that Web server provides services in response to requests from a client using a Web browser connected to the Internet. Alternatively, the connection may be to a corporate intranet or extranet of which the user's workstation is a component. Use of the term "Internet" herein, when discussing processing associated with the user's request, includes processing that occurs in an intranet or extranet, unless otherwise stated. In a Web environment, client requests will typically be sent to the host server using the HyperText Transfer Protocol (HTTP). However, because the present invention operates independently of the mechanism used to fetch the data, other protocols such as FTP, Gopher, proprietary protocols, etc., may also be used without deviating from the inventive concepts defined herein.

Figure 3A:
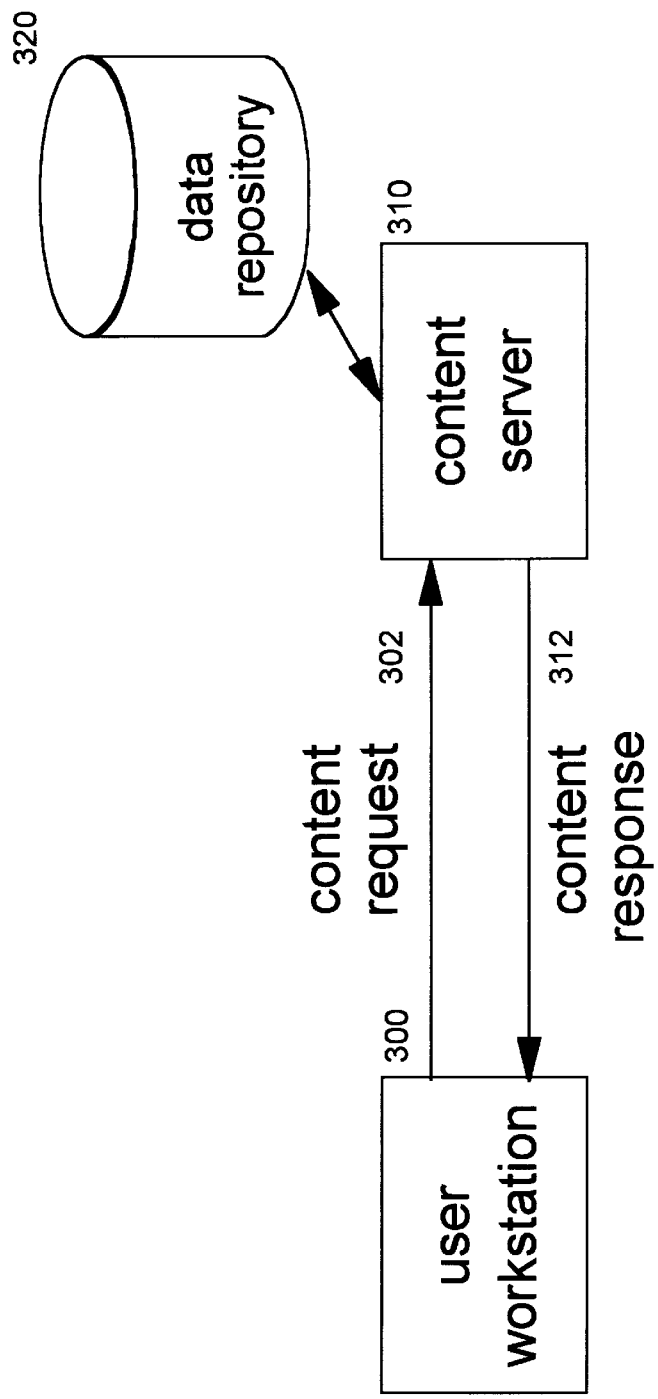
FIGS. 3A, 3B & 3C illustrate a client request and a server's response, with an optional content transformer that may access a transformation database.
Figure 3B:
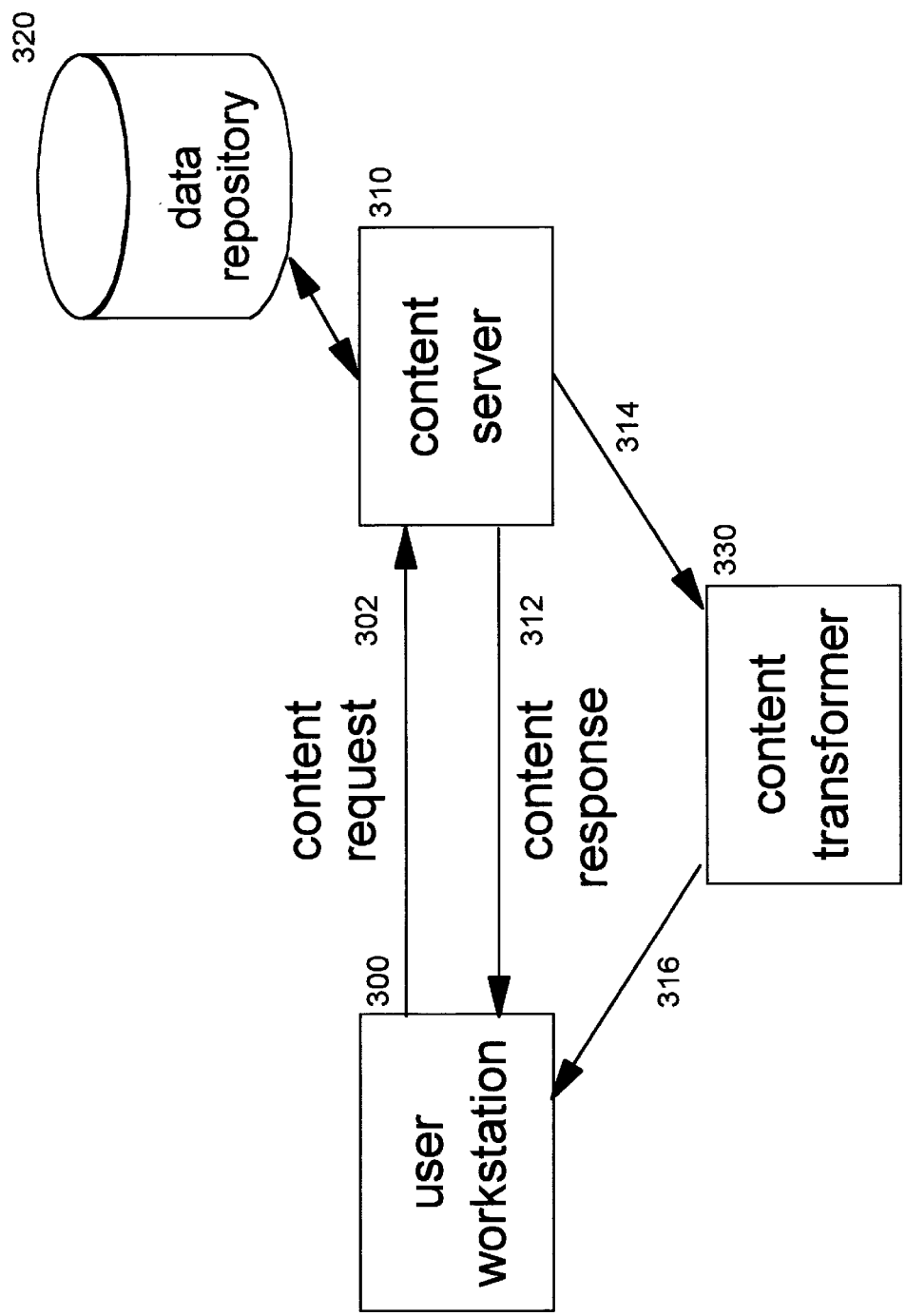
Figure 3C:
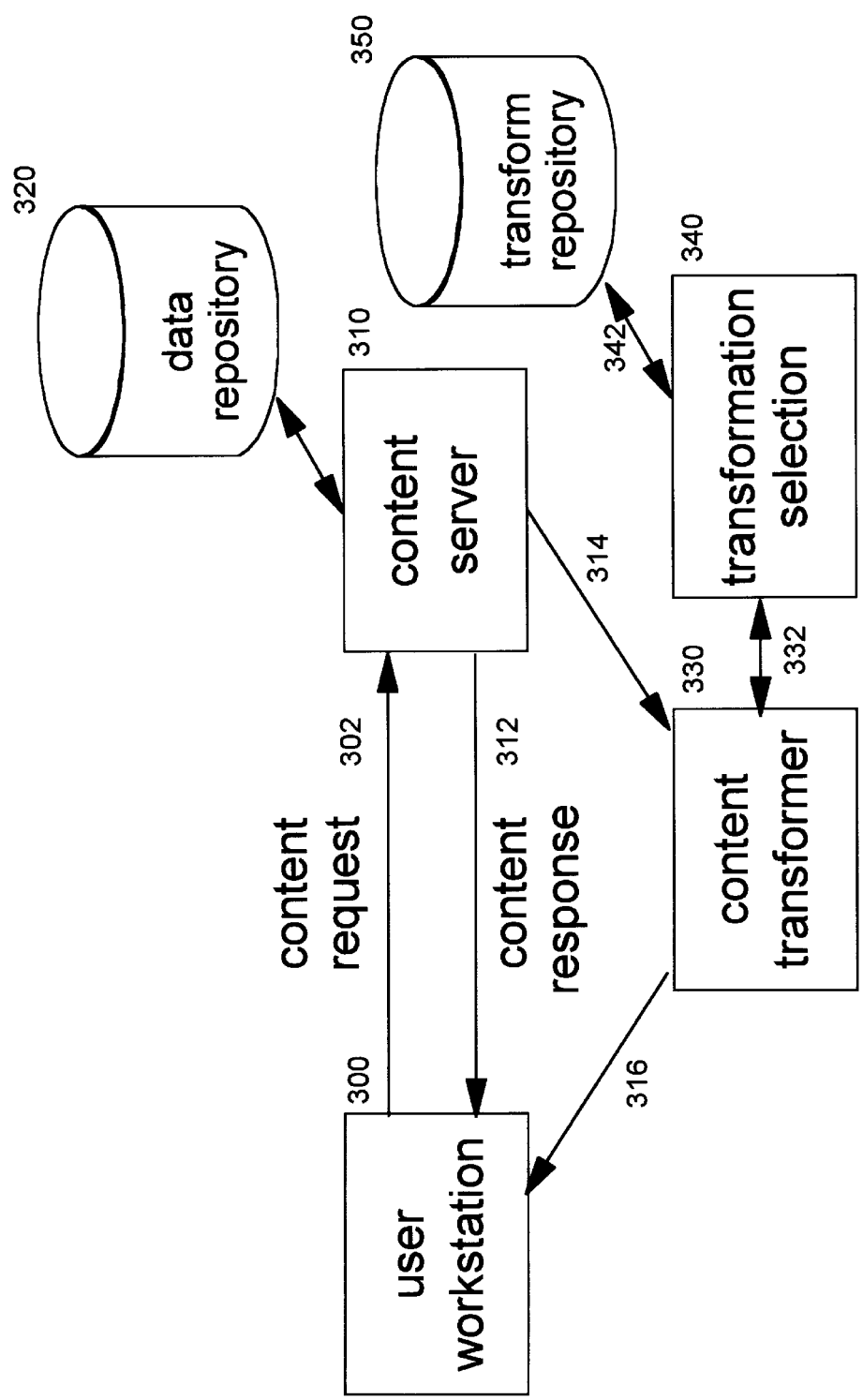

FIGS. 3A–3C illustrate a client request and a server's response, with an optional content transformer that may access a transformation database, as is known in the prior art. FIG. 3A shows the user's workstation 300 sending a content request 302 to the server 310 (referred to in FIG. 3 as a "content server" to reflect the fact that the server is locating the requested data content). The server 310 may access a data repository such as database 320 when fulfilling the user's request. The server 310 may perform computations on the data before returning it, or may simply return it unchanged. The requested data is then returned as content response 312. The manner in which the appropriate server 310 and server application (not shown) are located, and the manner in which the request 302 and response 312 are sent and received, are well known in the art. A common example of the scenario illustrated in FIG. 3A is a user in a Web environment making an HTTP request 302 from his Web browser (not shown) running on workstation 300, where the server 310 is a Web server that responds with a requested Web page 312.

FIG. 3B shows this same process augmented with an optional content transformer 330. The server 310 sends the located data 314 to the content transformer 330, which performs some type of transformation on that data. The result 316 is then sent to the client workstation 300. Note that while the content transformer 330 is shown in FIG. 3B as being separate from the server 310, the content transforming function may be a part of the same software application on the server 310 that responds to the user's request 302. Further, while FIG. 3B shows the result 316 of the transformation being sent to the client 300 from the content transformer 330, the result may instead be returned to the server application 3 10, which will then send that directly to the client 300 as indicated at 312.

The phrase "content transformation" could apply to any type of processing that is performed on data: for purposes of the present invention, it means a process performed with the goal of reducing the size of the data that will be returned to the user in response to his request. The phrases "content-reducing transformation" and "content-reducing filter" are used synonymously herein, and are referred to as "transforms" for ease of reference. Transcoding algorithms, discussed previously, are one type of content-reducing transform. Content transformers typically have at their disposal a number of content transformations that they can apply. When the transformer 330 receives content 314 that is a candidate for transformation, it consults the list of transformations available to it, and applies some type of selection process to select the most appropriate transformation. FIG. 3C illustrates this concept. The content transformer 330 accesses 332 the transformation selection engine 340, which then accesses 342 a repository of potential transformations 350 to select an appropriate content transformation. FIG. 3C shows the transformation selection engine 340 and repository 350 separated from the content transformer 330. However, this is for purposes of illustration only. The software implementing content transformer 330 may include within it the logic for selecting a transform 340, and may further include the details 350 for performing each potential tranformation.

In the prior art, the transformation selection process 340 uses static information, or information about network conditions, to select from the available transforms 350. The present invention defines a novel technique for taking into account dynamic environmental factors, and using these factors to select the type and degree of content reduction to be performed by the content transformer 330. According to the preferred embodiment, the environmental factors are related to the user and his workstation, and include: billing information about the user's connection to the network; current conditions on the workstation, including its available storage capacity; this user's behavior patterns; or any combination of these factors. (References to the workstation's storage capacity herein mean the currently-available capacity, as opposed to the total storage capacity of the device, unless otherwise indicated.)

The present invention allows the type and degree of content reduction to be tailored to dynamic conditions. The type of filter to be applied will depend on the type of input file that is a candidate for transformation. Filters providing different degrees of content reduction for each file type may be provided, enabling the embodiment of the present invention to select the most appropriate filter (and corresponding amount of content reduction) for the currently-existing conditions. If reduction is not necessary under current conditions, the user will receive the requested data unaltered. If only slight reduction is required, then a filter performing an intermediate type of reduction will be selected. The most severe forms of content reduction will only be performed when warranted by the current conditions. For example, when a file contains one or more images, an image transcoding filter may be selected to reduce the density of those images. When the file contains only text, the filters may specify various truncation approaches to shorten the message, thereby reducing the file size. Other file types may use these or similar techniques. For example, files containing sound may be reduced by filtering out part of the sound track, by truncating the file after a certain length of playing time, etc.

Varying degrees of reduction may be provided for image files, for example, by selecting a 256-color to 16-color transcoding filter for an intermediate level of reduction, whereas a 256-color to grayscale filter will be applied in a more severe situation—or, images may be completely suppressed in other situations. When intermediate reduction of text files is required, for example, a filter might be used to reduce e-mail messages so that subject headers plus only 150 bytes (or some other predetermined number of bytes) of the message will be sent, instead of the entire message. When a deeper level of byte reduction is called for, a different filter might be used that would send e-mail subject headers only, or that truncates the message at some shorter amount of message text. And, if the billing data indicates that the user's account is delinquent, he might receive only notification that mail is pending.

As an example of how this filter selection process provides for managing the volume of data a user receives, based on dynamic environmental factors, suppose the user's workstation at a point in time has limited storage capacity (or a limited amount of available storage, when overall capacity is not an issue). If the user has requested data from the server that results in the server sending one or more very large files, the workstation may not have the capacity to receive and store these files. If the file contains an image, a transcoding image filter such as those just described can be selected and applied, to reduce the size of the file that will be sent. While the degraded image detail resulting from application of a 256-color to 16-color transcoding filter (as one example) may be less aesthetically pleasing to a user, the user may be willing to make this tradeoff if his only other option is not to receive the file at all. Accordingly, the current device capacity is a factor used in one aspect of the transform selection process of the present invention. Or, the user may currently be connected from a workstation that supports only black and white images. The present invention can use this type of device characteristic to select a reduction to grayscale for all images, optimizing the number of bytes the workstation must receive and store. Note that some workstations, such as handheld devices, do not have disk storage available and store information in random-access memory ("RAM") instead. For purposes of the present invention, references to available "storage capacity" of the user's workstation refer to the amount of available RAM for workstations of this type.

Billing data is a factor used in another aspect of the transform selection process. As previously discussed, the user may have some number "N" of free minutes of connection time with this connection service, before he begins incurring additional charges. This aspect of the present invention checks to see how much time has been used (or, equivalently, how much free time remains) before sending a file. In addition, the system might detect that the user is connected using a long-distance carrier, where he is being billed based on the duration of the connection, or that he is using a graduated pricing service and is about to move into a higher rate category. Using these types of information, an appropriate filter will be selected to reduce the number of bytes sent to the user. Reducing the number of bytes will reduce the connection time for the receive operation to complete, which in turn will minimize the cost to the user.

The usage pattern of a particular user is a factor used in a further aspect of the transform selection process. In the preferred embodiment, behavior patterns for a user's e-mail viewing preferences are monitored. For example, if a particular user most frequently requests to download only the sender and subject of his e-mail messages, and only occasionally requests the entire message text, the server can use this behavioral information to establish a default delivery filter (to implement a default "download mode") for this user. Or, the default might be set so that only messages marked as "Urgent" are delivered, if the user has only been requesting such files. In the preferred embodiment, the following categories of behavior are tracked: the user requests to download sender-only for his e-mail messages; requests sender and subject; requests sender, subject and X bytes of text (where X is a number that is also tracked); and, requests the entire message. Using the selected delivery filter, the size and/or number of messages delivered to the user can be reduced.

The categories to be monitored will be predefined, and may vary in number and interpretation from those described above without deviating from the inventive concepts disclosed herein. The category criteria may be statically specified within an implementation, or may be configurable (e.g. by having the implementation read the criteria from a file created by a systems administrator).

In the preferred embodiment, the implementation detects the behavioral information by keeping track of the number of successive times this user has requested to download data using one of the defined categories. When the number for the most-recently-requested category exceeds some threshhold value, then this category is set to be the default download mode. The value of the threshhold may be a static predefined value, or it may be configurable (e.g. by providing a "Preferences" option in the implementation, which can be used by a systems administrator to set a specific value). The same value may be used as the threshhold for each category, or each category may have its own threshhold value.

The user's behavior when using other processes can be monitored in a similar manner to that described for e-mail, with appropriate modification of behavior categories. For example, if a Web server provides users the option of downloading pages with or without images (e.g. by providing a "text-only" option), the present invention can monitor a user's request to see which mode he most often chooses, and set this as a default.

An inferencing engine can optionally be used to detect patterns in the user's behavior, as further discussed below.

Combinations of the dynamic factors may be used to select a filter in a further aspect of the present invention. As an example of the more complex transformation that might result in this aspect, a rule for image files might specify first applying a transcoding algorithm to reduce the image to the greatest degree possible, and then to send the result only if it is under 1 kilobyte; otherwise, the image is to be suppressed. Or, an approach can be used where a separate rule is selected based on each environmental factor. The transforms specified by the applicable rules are then compared, and the most restrictive level of reduction applied. For example, if the billing data results in selecting a rule that does not apply a content reduction, but the device characteristics show that the user's workstation has a limited amount of storage available, then the reduction selected using the device capacity will be applied.

Figure 4:
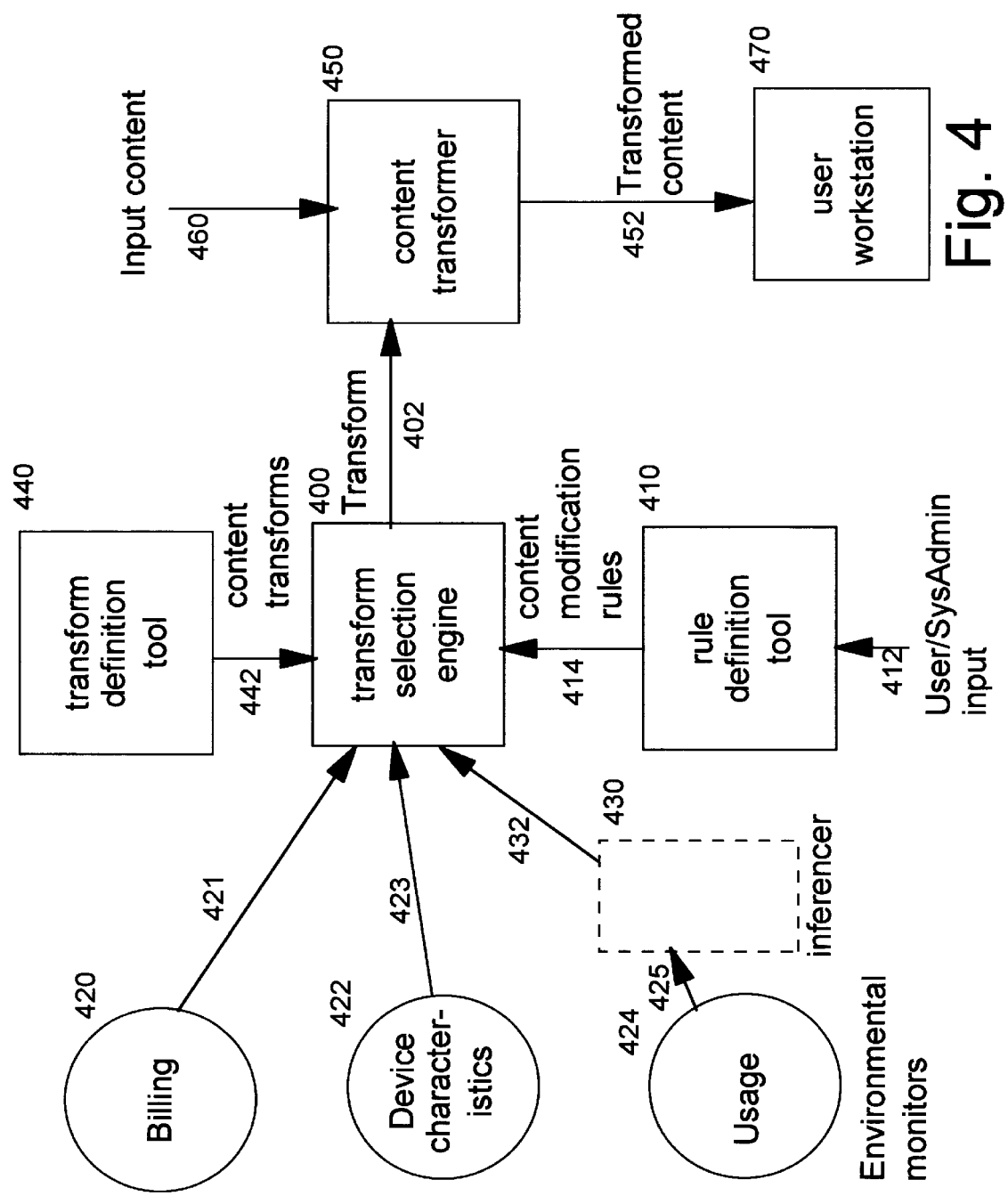
FIG. 4 illustrates the architecture of the preferred embodiment of the present invention, showing how the various components interact.

FIG. 4 illustrates the architecture of the preferred embodiment of the present invention, showing how the various components interact to select an appropriate content-reducing transformation filter, using dynamic environmental factors. It is an advantage of the present invention that the dynamic environmental factors are incorporated into the filter selection process in an automated manner, without requiring input from the user. This enables accurate information about constantly-changing conditions to be used. For example, a factor which may be considered is available storage capacity of the user's workstation. The user is not likely to know this information each time he requests something from a server, and it would not be reasonable to expect him to. That information will be obtained by the present invention, transparently to the user.

The transformation selection engine 400 accepts rules 414 that specify which content-reducing transformation should be applied in the presence of a given set of conditions. The rules will have previously been entered by a user or systems administrator 412, using some type of rule definition tool 410 (which may comprise simply a text editor). The rules 414 will correspond to the type of information the environmental monitors 420, 422, 424 are monitoring. The preferred embodiment includes rules specifying conditions related to billing information, workstation characteristics, and/or a user's behavior patterns.

As rule-based approach to transform selection is preferably used, which may include use of expert system techniques and components that are commercially available. Rule-based systems are known in the art, and will not be discussed in detail herein. In general, the rules used by such systems may be thought of as statements having 2 parts. The first part specifies a set of conditions under which the rule will "match" (i.e. it will be selected as applicable). The second part specifies some action to be taken when the rule is selected as a match. For the preferred embodiment of the present invention, the following types of information may be included as conditions: (1) billing information; (2) device characteristics; and (3) types of user behavior that may be exhibited when a user requests information from a content server. As an example of using device characteristics for conditions, a user may currently be using an IBM WorkPad, which is a handheld computer. ("WorkPad" is a registered trademark of IBM.) Certain models of this computer can display only black and white, and typically have 2 megabytes of memory. Thus, a rule could be created specifying that if (i) the user's workstation is one of these devices, and (ii) the file to be sent is (or contains) a 256-color image, then reduction to grayscale is to be performed before sending the file.

As the system embodying the present invention executes, environmental monitors 420, 422, and/or 424 observe the state of factors 421, 423, 425 that will be used by the transform selection engine 400 as the conditions for selecting the appropriate transform 402. Optionally, any of the monitored factors may be routed through an inference engine 430 that detects patterns. The inference engine's output 432, and possibly the raw data from which it infers the pattern, is then used by the selection engine 400.

When the user connects to a network through a service provider ("SP"), the connection goes through a server operated by that SP before being routed to the content server—unless the SP's server is the content server, such as may be the case when the user is requesting e-mail service. This enables the user's account billing information, also maintained by the SP, to be readily accessible by an embodiment of the present invention. When billing information is being monitored, the implementation requests the user's current billing information prior to returning any requested data to that user. (To optimize the efficiency of an implementation, the billing data may be re-used if it was obtained within some defined recent time interval.) To incorporate workstation characteristics into the filter selection process, upon receiving a request from a user, a request for the pertinent device data is sent back to that user's workstation. The request may execute on the user's workstation as an applet, for example. When the result of that request is received by the implementation of the present invention, the filter selection process continues. (Note that while requesting device characteristics from a workstation is known in the prior art, the inventors know of no techniques whereby that information is used to select an appropriate transformation, as disclosed herein.) The user behavior information is readily available, when used as an input factor, having been stored by the implementation of the invention.

Inferencing was discussed above as a technique for detecting user preferences based on tracking successive user requests for download modes. More complicated patterns may be detected when an inference engine is used, using techniques which are well known in the art. (The details of implementing an inference engine do not form part of the present invention.) As an example, a user's workstation's storage capacity may not be limited at the point in time when he makes a certain request for downloading data. However, it may be that he is about to request other files subsequently, the receipt of which will cause the storage to become constrained. There may be detectable patterns to these requests. For example, the user may request a series of statistical reports from a server on the last day of each month. The present invention can use this information to "look ahead" beyond the current request and apply a content reduction filter that optimizes the user's chances of being able to store not only the first file, but the ones that are likely to follow.

The transform selection engine 400 uses the information supplied by the environmental monitors (and optional inferencing engine 430) regarding the current dynamic conditions, and the rules 414, to select an appropriate transform 402 from a collection of available content transforms 442. The content transforms will have been previously created with a transform definition tool 440 (which may comprise simply a text editor). Each transform specifies a technique for reducing the contents of a file. One example is a 256-color-to-grayscale reduction algorithm for images. Another example is an algorithm that counts the number of bytes of a text file, and truncates the text after some fixed byte count. The selected transform 402 is then sent to a content transformer 450, which will apply the transformation 402 to the data 460 that the content server located in response to the user's request. When a reduction is required, the transform may be applied by invoking a subroutine or function (or a method, in an object-oriented environment),
passing the input content 460 as a parameter. The result is transformed data content 452 (which may be identical to the input content 460 if no reduction was warranted under current conditions), which is then sent to the user's workstation 470.

While a specific architecture for the system of the preferred embodiment is described in FIG. 4, alternative approaches may be used without deviating from the inventive concepts of the present invention. For example, logic specifying the conditions and corresponding transformation may be coded directly into the software that implements the transformation selection function 400. The selection process may use a conventional if-then-else approach (or other similar syntax, such as "select" statements) to select a transformation, instead of a rule-based approach where a rule-processing engine matches conditions against rules. In that situation, the conditions are expressed in the "if" clauses, and the corresponding transformations are specified in the "then" clauses. Further, the logic of content transforms 442 may be accessed by (or implemented as part of) the software implementing the content transformer function 450. In that case, the transform selection engine 400 would first select a content transform, and instead of sending the transform 402 to the content transformer 450, would merely send an identifier to inform the content transformer 450 which transformation it should apply. In addition, the environmental monitors 420, 422, 424 may be implemented together as a single monitoring function, which may also include capabilities for inferring patterns from the observed information. Further, while specific examples of environmental factors have been discussed herein, it will be apparent to one of ordinary skill in the art that additional or different factors may be monitored.

Different degrees of filtering for the monitored factors will now be illustrated in greater detail through use of examples.

For billing information as a criterion for filter selection, the following are examples of threshholds that may be established, e.g. by the systems administrator of an e-mail server: (i) a first billing limit, above which only mail-arrival notification is sent; (ii) a second billing limit, above which only an identification of the sender is transmitted; (iii) a third billing limit, above which only sender and subject are transmitted; (iv) a set of billing limits above which the sender, subject, and X bytes of the message are transmitted (where X may be configurable for each such threshhold); and (v) a billing limit at which the entire message is transmitted, with no content reduction. In addition, a threshhold can be set above which nothing is delivered, such as when the user has not paid his connection service bill. The incremental approach of the present invention enables different degrees of service degradation to be applied, based on billing information, including but not limited to complete suspension of e-mail delivery. Similar types of threshhold limits can be used with other types of files, for varying degrees of content reduction. Prior art systems known to the inventors do not apply incremental reductions in this manner as accounts become tardy, but instead provide for the content to either be delivered completely, or not delivered at all.

FIG. 5A shows an e-mail message that has been delivered when the selected filter specified that the sender, the subject, and the first 45 bytes of the message should be delivered.

An implementation may allow the systems administrator to select whether the defined threshholds are optional for a user (for example, enabling the user to employ these filters to save himself money on his connection time), or mandatory (to ensure that users don't overspend a defined account limit.) Optionally, an implementation may also permit a user to modify these threshholds. When this option is provided, the implementation may also enable a systems administrator to specify certain ranges within which the user may select a different value. When the user and systems administrator are both allowed to set threshholds, the preferred embodiment will give precedence to the more restrictive value.

When using device characteristics, specifically available device capacity, as a criterion for filter selection, the following are examples of threshholds that may be established for an e-mail server: (i) a first amount of remaining RAM, below which only mail-arrival notification is sent; (ii) a second amount of remaining RAM, below which only the sender is transmitted; (iii) a third amount of remaining RAM, below which only sender and subject are transmitted; (iv) a set of remaining RAM threshholds below which only sender, subject, and X bytes of the message are transmitted (where X may be configurable for each such threshhold); and (v) an amount of remaining RAM at which no content reduction is applied, so that the entire e-mail message is delivered. In addition, a threshhold can be set below which nothing is delivered.

Figure 6A:
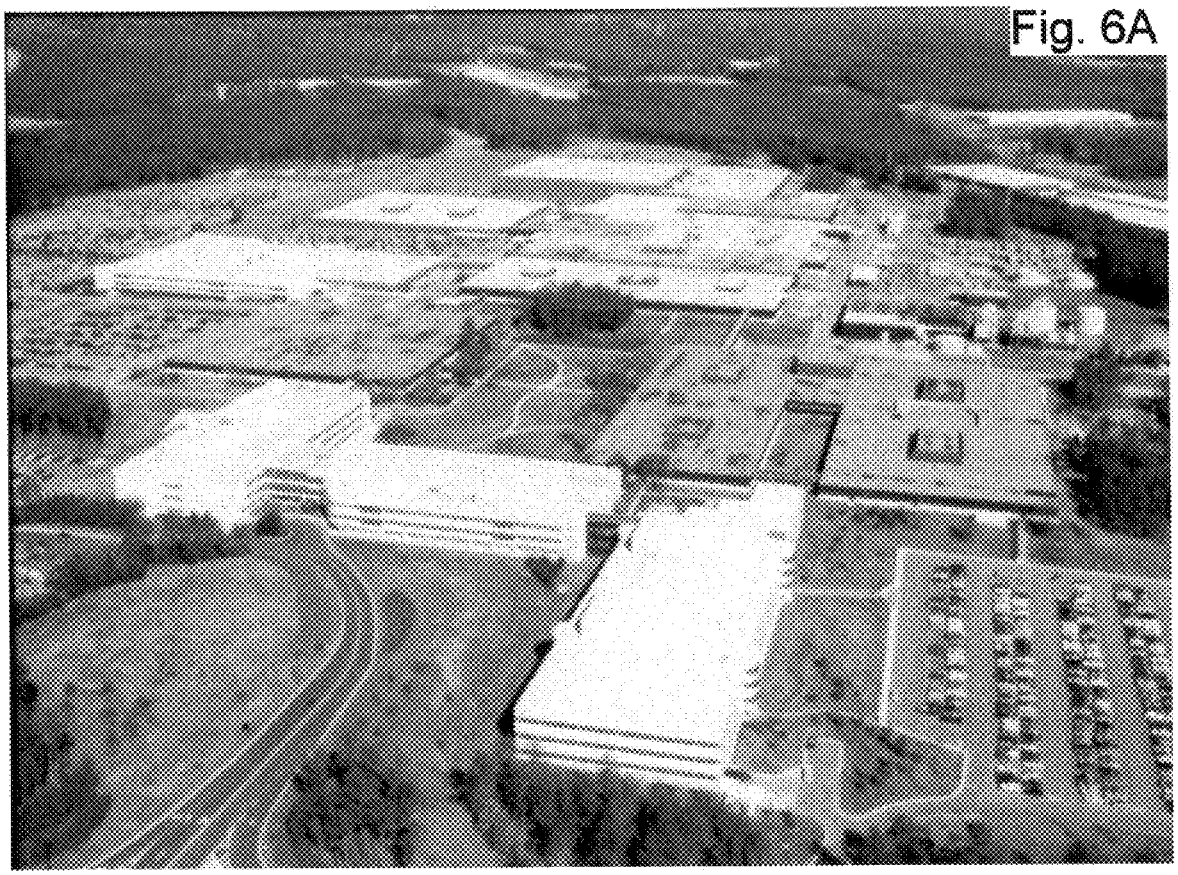
Figure 6B:
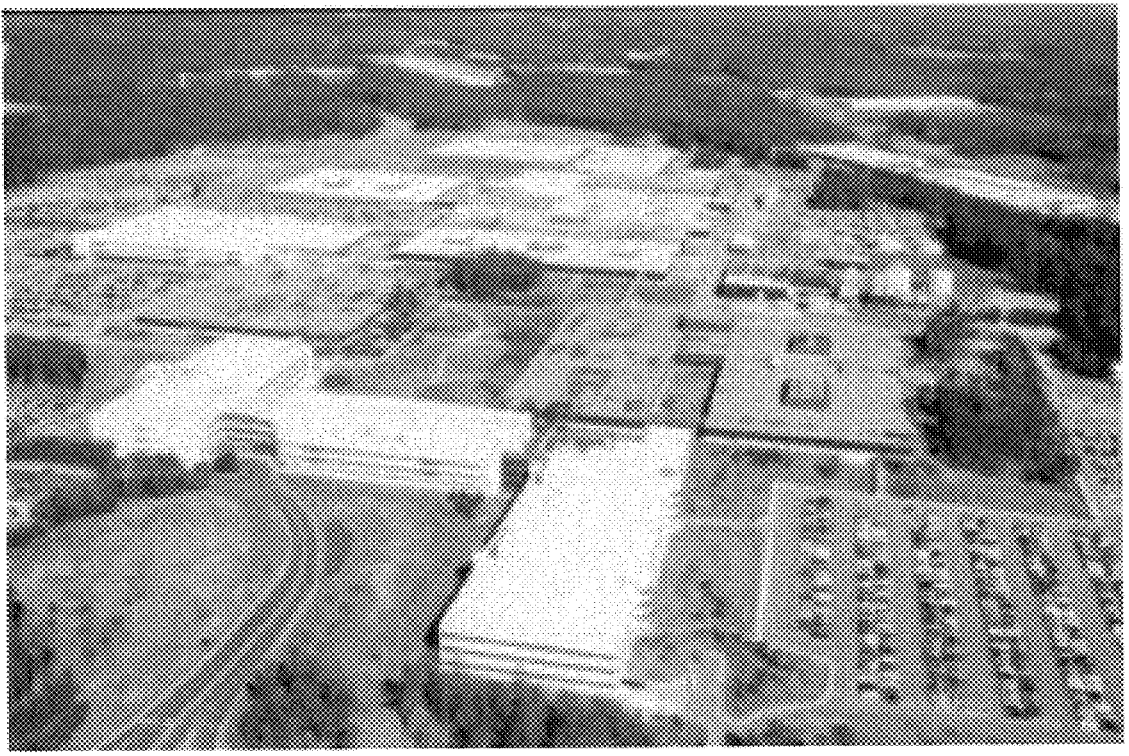

As with the other monitored factors, this incremental approach also applies to types of data other than e-mail. FIG. 5B1 shows an example of an image produced from a grayscale file sent to a user. FIG. 5B2 shows a corresponding image, rendered in outline format, from a file that may have been sent to a user when his workstation had storage constraints. The two views of this simple graphic illustrate how the transcoding process can reduce the amount of detail in an image (and the number of bytes required to represent the image). However, image files generally contain much more complex figures. An example of a complex image is shown in FIG. 6A, which is a digitized representation of a photograph. When rendered in color as an image of approximately 8 inches by 11 inches in size, over 350,000 bytes were required for a representation of this figure in "gif" format (Graphics Interchange Format). Applying a transcoding filter that (i) converts the image to black and white, (ii) scales it to 40 percent of the original size, and (iii) converts the representation to "jpeg" format (Joint Photographic Experts Group) with the image quality reduced by 50 percent, the corresponding image shown in FIG. 6B is created. Slightly over 16,000 bytes were required to represent this transformed version of the image, a reduction of approximately 95 percent.

Examples of using usage behavior patterns, such as e-mail viewing preference, as a criterion for filter selection have been previously discussed.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment capable of having a connection to a network, computer readable code embodied on a computer-readable medium readable by a computer system in said environment, for selecting and applying a content-reducing filter using dynamic environmental factors, comprising:

one or more input files;

an environmental monitor which observes a user's behavior when downloading files from a server;

a plurality of content-reducing transformations;

a plurality of rules specifying selection criteria for selecting one of said transformations;

a subprocess for receiving dynamic condition input from said environmental monitor;

a subprocess for selecting one of said rules using said dynamic condition input; and a subprocess for transforming said one or more input files using said transformation specified by said selected rule.

2. In a computing environment capable of having a connection to a network, computer readable code embodied on a computer-readable medium readable by a computer system in said environment, for selecting and applying a content-reducing filter using dynamic environmental factors, comprising:

one or more input files;

a plurality of environmental monitors, wherein said plurality comprises environmental monitors for more than one of: billing information, characteristics of a user's workstation, and a user's behavior when downloading files from a server;

a plurality of content-reducing transformations;

a plurality of rules specifying selection criteria for selecting one of said transformations;

a subprocess for receiving dynamic condition input from said plurality of environmental monitors;

a subprocess for selecting one of said rules using said dynamic condition input, further comprising one of:

a subprocess for selecting a most restrictive level of reduction using one of said selected rules for each of said environmental monitors; or a subprocess for selecting one of said rules using a combination of said dynamic input from each of said environmental monitors; and a subprocess for transforming said one or more input files using said transformation specified by said selected rule.

3. A system for selecting and applying a content-reducing filter using dynamic environmental factors in a computing environment capable of having a connection to a network, comprising:

one or more input files;

an environmental monitor which observes a user's behavior when downloading files from a server;

a plurality of content-reducing transformations;

a plurality of rules specifying selection criteria for selecting one of said transformations;

means for receiving dynamic condition input from said environmental monitor;

means for selecting one of said rules using said dynamic condition input; and means for transforming said one or more input files using said transformation specified by said selected rule.

4. A system for selecting and applying a content-reducing filter using dynamic environmental factors in a computing environment capable of having a connection to a network, comprising one or more input files;

a plurality of environmental monitors, wherein said plurality comprises environmental monitors for more than one of: billing information, characteristics of a user's workstation, and a user's behavior when downloading files from a server;

a plurality of content-reducing transformations;

a plurality of rules specifying selection criteria for selecting one of said transformations;

means for receiving dynamic condition input from said plurality of environmental monitors;

means for selecting one of said rules using said dynamic condition input, further comprising one of:

means for selecting a most restrictive level of reduction using one of said selected rules for each of said environmental monitors; or means for selecting one of said rules using a combination of said dynamic input from each of said environmental monitors; and means for transforming said one or more input files using said transformation specified by said selected rule.

5. A method for selecting and applying a content-reducing filter using dynamic environmental factors in a computing environment capable of having a connection to a network, comprising the steps of:

receiving dynamic condition input from an environmental monitor which observes a user's behavior when downloading files from a server;

selecting one of a plurality of rules using said dynamic condition input, each of said rules specifying selection criteria for selecting one of a plurality of content-reducing transformations; and transforming one or more input files using said transformation specified by said selected rule.

6. A method for selecting and applying a content-reducing filter using dynamic environmental factors in a computing environment capable of having a connection to a network, comprising the steps of:

receiving dynamic condition input from a plurality of environmental monitors, wherein said plurality comprises environmental monitors for more than one of: billing information, characteristics of a user's workstation, and a user's behavior when downloading files from a server; and selecting one of a plurality of rules using said dynamic condition input, each of said rules specifying selection criteria for selecting one of a plurality of content-reducing transformations, further comprising one of:

selecting a most restrictive level of reduction using one of said selected rules for each of said environmental monitors; or selecting one of said rules using a combination of said dynamic input from each of said environmental monitors; and transforming one or more input files using said transformation specified by said selected rule.

7. A method for selecting and applying a content-reducing filter using dynamic environmental factors in a computing environment having a connection to a network, comprising the steps of:

providing at least one environmental monitor, wherein said at least one environmental monitor observes one or more of (1) a user's behavior when downloading files from a server; (2) an available storage capacity of a computing device associated with said user; and (3) billing characteristics of said connection to said network, said billing characteristics comprising one or more of (a) whether said connection to said network is a long distance connection, (b) whether a service provider account of said user for said connection has available free units of connect time, and (c) whether said service provider account uses a graduated pricing structure;

receiving dynamic condition input from said at least one environmental monitor;

selecting one of a plurality of rules using said dynamic condition input, each of said rules specifying selection criteria for selecting one of a plurality of content-reducing transformations; and transforming one or more input files using said transformation specified by said selected rule.

8. The method according to claim 7, wherein one of said at least one environmental monitors observes said user's behavior when downloading files from said server, and wherein said receiving dynamic condition input step further comprises the steps of counting occurrences of selected categories of said user's behavior;

comparing said counted occurrences to a threshold value; and setting a default download mode for said user when said comparing step determines that said threshold value has been exceeded.

9. The method according to claim 7, wherein one of said at least one environmental monitors observes said available storage capacity of said computing device associated with said user, and wherein said receiving dynamic condition input step further comprises the step of polling said computing device for said available storage capacity.

10. The method according to claim 7, wherein one of said at least one environmental monitors observes said billing characteristics of said connection to said network, and wherein said receiving dynamic condition input step further comprises the step of requesting said billing characteristics from a service provider of said service provider account.

* * * * *